(12) United States Patent
Yoshikawa et al.

(10) Patent No.: US 6,704,503 B2
(45) Date of Patent: Mar. 9, 2004

(54) OPTICAL DEVICE, OPTICAL DEVICE DRIVING UNIT, INFORMATION WRITE DEVICE, PRESET INFORMATION SETTING SYSTEM, AND CAMERA SYSTEM

(75) Inventors: Kazumasa Yoshikawa, Utsunomiya (JP); Satoshi Natsume, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 09/820,698

(22) Filed: Mar. 30, 2001

(65) Prior Publication Data

US 2001/0055481 A1 Dec. 27, 2001

(30) Foreign Application Priority Data

Apr. 5, 2000 (JP) ........................................ 2000-103485

(51) Int. Cl.$^7$ .............................. G03B 5/00; G03B 3/10
(52) U.S. Cl. ..................... 396/76; 396/86; 396/103; 396/135; 348/211.99; 348/240.3
(58) Field of Search ................................ 348/211, 358, 348/211.99, 211.2, 211.9, 240.99, 240.3; 396/76, 86, 133, 135, 136, 91, 93, 89, 85, 87; 359/696, 697

(56) References Cited

U.S. PATENT DOCUMENTS

| 4,423,934 | A | * | 1/1984 | Lambeth et al. ............... 396/89 |
| 5,838,368 | A | * | 11/1998 | Masunaga et al. ........... 348/211 |
| 5,929,904 | A | * | 7/1999 | Uchida ........................ 348/211 |
| 6,526,232 | B1 | * | 2/2003 | Mizumura ................ 396/76 X |

FOREIGN PATENT DOCUMENTS

JP          02001124978 A    *  5/2001    ............ G02B/7/08

* cited by examiner

Primary Examiner—W. B. Perkey
(74) Attorney, Agent, or Firm—Fitzpatrick, Cella, Harper & Scinto

(57) ABSTRACT

Disclosed is an optical device including an optical member, a driving member for driving the optical member, a storage member for storing preset information about driving of the optical member, an information write device for writing the preset information in the storage member from the outside of the optical device, and a control member for performing driving control of the driving member. The control member performs preset driving control of the driving member on the basis of the preset information stored in the storage member.

12 Claims, 9 Drawing Sheets

OPTICAL DEVICE, OPTICAL DEVICE DRIVING UNIT, INFORMATION WRITE DEVICE, PRESET INFORMATION SETTING SYSTEM, AND CAMERA SYSTEM

BACKGROUND OF THE INVENTION

1. Field of the Invention

The present invention relates to an optical device such as a zoom lens, an optical device driving unit, an information write device, a preset information setting system, and a camera system used in a TV camera, video camera, and the like.

2. Related Background Art

Photographing operation using a TV camera, TV lens, and the like adopts various photographing methods. To more easily and accurately realize these photographing methods, there is a lens device having various so-called preset control functions.

First, a zoom lens is moved to a predetermined zoom position at a high speed during photographing operation, and photographing operation restarts from this position. This photographing method is implemented using a function of storing an arbitrary zoom position as a preset position in advance and turning on a switch during a photographing operation to move the zoom lens to the preset position at the maximum driving speed drivable by the lens device. This function will be referred to as a fast position preset zoom hereinafter.

Second, a photographing operation is performed while the zoom lens is moved at a predetermined zoom ratio and a predetermined constant speed. This photographing method is achieved using a function of storing an arbitrary zoom position as a preset position in advance, storing an arbitrary zoom lens driving speed as a preset speed, and turning on a switch during a photographing operation to move the zoom lens to the preset position at the preset speed. This function will be referred to as a memory position preset zoom hereinafter.

Third, a photographing operation is performed while the zoom lens is moved at a predetermined speed. This photographing method is realized using a function of storing an arbitrary zoom lens driving direction as a preset direction in advance, storing an arbitrary zoom lens driving speed as a preset speed, and turning on a switch during a photographing operation to move the zoom lens in the preset direction at the preset speed. This function will be referred to as a speed preset zoom hereinafter.

Fourth, the zoom position is changed while an object is photographed at a given zoom position, and then the zoom position is returned to an original one to continue photographing operation. This photographing method is attained using a function of storing an arbitrary zoom position as a preset position in advance, turning on a switch to store the zoom position at the switch-on timing, driving the zoom lens to the preset position, enabling a photographing operation, then turning off the switch to drive the zoom lens to the zoom position stored at the switch-on timing, and enabling a photographing operation. This function will be referred to as a shuttle zoom hereinafter.

The preset position and preset speed which must be stored for each function are set by, e.g., the variable resistor of the lens device for each function. As some of recent functions, a zoom position, speed, or direction in actually driving a zoom lens is detected, and detection information obtained at the operation timing of a switch for designating storage is stored as a preset position, preset speed, or preset direction in a semiconductor memory or the like.

As a recent photographing form, a TV camera or TV lens is installed in a virtual studio or mounted on a remote-control pan head, and remote-controlled by a controller. This form is becoming popular.

A TV lens having the conventional preset control functions is equipped with a storage command operation means such as a variable resistor or switch used in storing a preset position, preset speed, or preset direction. To store a preset position or the like in a remote-control photographing form, the user must go to the place where the TV camera or TV lens is located. This is inconvenient.

In a lens device having the conventional preset control functions, it is difficult to store a preset position by inputting a focal length or to store a preset speed by using an entire zoom range movable time.

SUMMARY OF THE INVENTION

It is an object of the present invention to enable setting preset information such as a preset position, preset speed, or preset direction via an information write device set outside (e.g., remote place) an optical device or driving unit. Particularly in a remote-control photographing form, the user can set preset information without going close to the optical device or the like, which is very convenient.

It is another object of the present invention to equip an optical device or driving unit with an information conversion means for converting preset information of an arbitrary form received from an information write device into preset information of a form processible in preset driving control, thereby enabling conversion setting of a preset position by inputting a desired focal length to the information write device, or enabling conversion setting of a preset speed by inputting a desired entire zoom range movable time to the information write device.

It is still another object of the present invention to arrange a selection means for selecting which of preset information set on the device side or preset information acquired via the information write device is used to perform preset driving control, thereby increasing choices of usable preset information and realizing a more useful preset control function.

To achieve the above objects, according to the present invention, there is provided an optical device comprising an optical member, driving means for driving the optical member, storage means for storing preset information about driving of the optical member, an information write device for writing the preset information in the storage means from outside of the optical device, and control means for performing driving control of the driving means, wherein the control means performs preset driving control of the driving means on the basis of the preset information stored in the storage means.

According to the present invention, there is provided an optical device driving unit mounted on or connected to an optical device main body having an optical member, comprising an optical member, driving means for driving the optical member, storage means for storing preset information about driving of the optical member, an information write device for writing the preset information in the storage means from outside of the optical device, and control means for performing driving control of the driving means, wherein the control means performs preset driving control of the driving means on the basis of the preset information stored in the storage means.

According to the present invention, there is provided an information write device connected to an optical device including an optical member, driving means for driving the optical member, storage means for storing preset information about driving of the optical member, and control means for performing driving control of the driving means, the control means performing preset driving control of the driving means on the basis of the preset information stored in the storage means, comprising connection means for connecting the information write device to the optical device, driving command operation means operated to designate driving of the optical member, the driving command operation means generating driving information, and storage command operation means operated to store the driving information from the driving command operation means as preset information in the storage means.

According to the present invention, there is provided a preset information setting system having an optical device and an information write device connected to the optical device, comprising an optical member, driving means for driving the optical member, storage means for storing preset information about driving of the optical member, control means for performing driving control of the driving means, the control means performing preset driving control of the driving means on the basis of the preset information stored in the storage means, connection means for connecting the information write device to the optical device, driving command operation means operated to designate driving of the optical member, the driving command operation means generating driving information, and storage command operation means operated to store the driving information from the driving command operation means as preset information in the storage means.

According to the present invention, there is provided a camera system having a camera on which an optical device is mounted, comprising an optical member, driving means for driving the optical member, storage means for storing preset information about driving of the optical member, an information write device for writing the preset information in the storage means from outside of the optical device, and control means for performing driving control of the driving means, the control means performing preset driving control of the driving means on the basis of the preset information stored in the storage means.

The above and other objects, features, and advantages of the present invention will be apparent from the following description of embodiments in conjunction with the accompanying drawings.

DETAILED DESCRIPTION OF THE PREFERRED EMBODIMENTS (First Embodiment)

Figure 1:
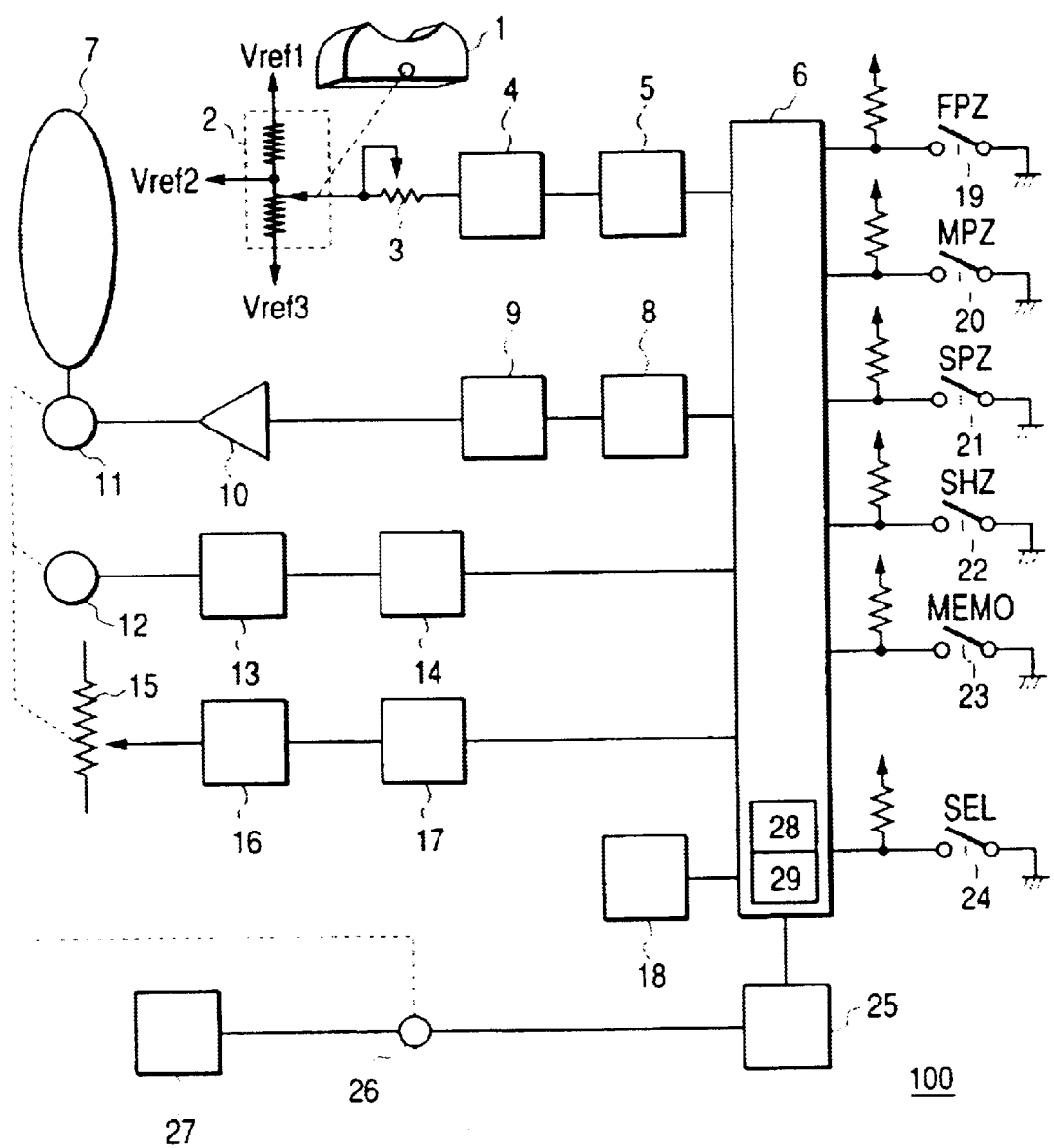
FIG. 1 is a diagram showing the arrangement of a TV lens according to the first embodiment of the present invention.

FIG. 1 shows the arrangement of a lens device (optical device) according to the first embodiment of the present invention. In FIG. 1, a TV lens 100 serves as the above-mentioned lens device. A zoom control switch 1 is manipulated by the user. A command signal generation circuit 2 generates a command signal for designating a driving direction and driving speed (or a driving amount and driving position) proportional to the manipulation amount of the zoom control switch 1 in order to electrically drive a zoom lens optical system (optical member) 7 for adjusting the magnification of the lens device.

A zoom speed variable volume control 3 changes the driving speed of the zoom lens optical system 7 depending on the manipulation amount of the zoom control switch 1. A command signal calculation circuit 4 executes signal level shift conversion in order to supply a command signal to an A/D conversion circuit 5. The A/D conversion circuit 5 converts an analog signal output from the command signal calculation circuit 4 into a digital signal.

A CPU 6 controls the operation of the lens device. The CPU 6 also controls the above-described four preset driving control functions "fast position preset zoom", "memory position preset zoom", "speed preset zoom", and "shuttle zoom". The CPU 6 incorporates a CPU preset information memory 28 and CPU optical information memory 29.

The CPU preset information memory 28 stores three pieces of preset information (device-side preset information), i.e., a preset position, preset speed, and preset direction which are used in the respective preset driving control functions and are set in the TV lens 100, which will be described later.

The CPU optical information memory 29 stores in advance optical conversion information (arithmetic equation, table data, or the like) for converting preset information of an arbitrary form input via an external write device (information write device) 27 (to be described later) into information corresponding to a position signal or speed signal from a zoom position detector 15 or zoom speed detector 12, i.e., information of a form processible by the CPU 6 in performing preset driving control.

A D/A conversion circuit 8 converts a command signal output from the CPU 6 in order to drive the zoom lens optical system 7, from a digital signal to an analog signal. A CPU command signal calculation circuit 9 performs signal level shift conversion for the command signal output from the D/A conversion circuit 8. A power amplifying circuit 10 amplifies the command signal output from the CPU command signal calculation circuit 9 and supplies the amplified signal to a motor 11 for driving the zoom lens optical system 7. In practice, the motor 11 drives the zoom lens optical system 7 along the optical axis by rotating and driving about the optical axis a lens operation ring (not shown) which engages with the zoom lens optical system 7 via a cam.

The speed detector 12 outputs a speed signal corresponding to the driving speed of the zoom lens optical system 7.

A speed signal calculation circuit 13 executes signal level shift conversion in order to supply the speed signal to an A/D conversion circuit 14. The A/D conversion circuit 14 converts an analog signal output from the speed signal calculation circuit 13 into a digital signal and outputs the digital signal to the CPU 6.

The position signal detector 15 outputs a position signal corresponding to the position of the zoom lens optical system 7. A position signal calculation circuit 16 performs signal level shift conversion in order to supply the position signal to an A/D conversion circuit 17. The A/D conversion circuit 17 converts an analog signal output from the position signal calculation circuit 16 into a digital signal and outputs the digital signal to the CPU 6.

A memory (storage means) 18 stores preset information when the preset information is acquired via the external write device 27, which will be described later.

A fast position preset zoom (FPZ) switch 19 is arranged for "fast position preset zoom" and designates the start and end of this preset driving control operation.

By turning on the fast position preset zoom switch 19, the zoom lens optical system 7 can be moved from the current position at the ON timing to a preset position stored in the CPU preset information memory 28 or memory 18 in advance (to be described later) at a predetermined speed (e.g., maximum speed in the TV lens 100). This driving can be stopped by turning on the fast position preset zoom switch 19 again or releasing the ON state (turning off the switch 19).

A memory position preset zoom (MPZ) switch 20 is arranged for "memory position preset zoom" and designates the start and end of this preset driving control operation.

By turning on the memory position preset zoom switch 20, the zoom lens optical system 7 can be moved from the current position at the ON timing to a preset position stored in the CPU preset information memory 28 or memory 18 in advance (to be described later) at a similarly stored preset speed. This driving can be stopped by turning on the memory position preset zoom switch 20 again or releasing the ON state (turning off the switch 20).

A speed preset zoom (SPZ) switch 21 is arranged for "speed preset zoom" and designates the start and end of this preset driving control operation.

By turning on the speed preset zoom switch 21, the zoom lens optical system 7 can be moved from the current position at the ON timing in a preset direction stored in the CPU preset information memory 28 or memory 18 in advance (to be described later) at a similarly stored preset speed. This driving can be stopped by turning on the speed preset zoom switch 21 again or releasing the ON state (turning off the switch 21).

A shuttle zoom (SHZ) switch 22 is arranged for "shuttle zoom" and designates the start and end of this preset driving control operation.

By turning on the shuttle zoom switch 22, the zoom lens optical system 7 can be moved from the current position at the ON timing to a preset position stored in the CPU preset information memory 28 or memory 18 in advance (to be described later) at a predetermined speed (e.g., low speed). Further, the position (home position) at the ON timing of the shuttle zoom switch 22 is stored in the CPU preset information memory 28 or the like. After the zoom lens optical system 7 reaches the preset position, the zoom lens optical system 7 can be moved to the home position at a predetermined speed (e.g., low speed) by releasing the ON state of the shuttle zoom switch 22 (turning off the switch 22).

A memory (MEMO) switch 23 designates storage of each preset information. A preset information selector (SEL) switch (selection means) 24 causes the user to select, as preset information used for preset driving control, preset information (device-side preset information) stored in the CPU preset information memory 28 on the lens device side or preset information stored in the CPU preset information memory 28 via the external write device 27 by using the zoom control switch 1, fast position preset zoom switch 19, memory position preset zoom switch 20, speed preset zoom switch 21, shuttle zoom switch 22, and memory switch 23, which will be described later.

An information converter (information conversion means) 25 converts information from the external write device 27 into information of a form processable by the CPU 6 by using optical conversion information stored in the CPU optical information memory 29.

A connector 26 mechanically and electrically connects the TV lens 100 and external write device 27.

The external write device 27 is implemented by a personal computer or the like, and is connected to the TV lens 100 to constitute a preset information setting system. The external write device 27 inputs preset information (to be described later) of an arbitrary form for the zoom lens optical system 7 to the information converter 25 of the TV lens 100 in accordance with the operation of a user who is to write preset information.

The preset driving control switches 19 to 22, memory switch 23, and preset information selector switch 24 may be arranged in the TV lens 100 or in a demand (external control unit) which is connected to the TV lens 100 via a cable or the like and comprises a thumb ring instead of the zoom control switch 1.

Building components of the above arrangement except for optical adjustment means such as the zoom lens optical system 7, i.e., circuits such as the zoom control switch 1 and CPU 6, the motor 11, the speed detector 12, the position detector 15, the preset driving control switches 19 to 22, the memory switch 23, and the preset information selector switch 24 may be arranged in a lens driving unit (optical device driving unit) used after being mounted on or connected to a handy type lens device main body.

In the lens device (or lens driving unit) with this arrangement, the TV lens 100 side (i.e., not using the external write device 27) must drive the zoom lens optical system 7 to a preset position by the motor as pre-work for storing a preset position, and must drive the zoom lens optical system 7 in advance by the motor in order to store the preset speed and preset direction.

Driving control of the zoom lens optical system 7 via the zoom control switch 1 will be explained. When the zoom control switch 1 is manipulated, the command signal generation circuit 2 outputs a zoom switch command signal for designating a driving direction and driving speed (or driving amount and driving position) proportional to the manipulation amount of the zoom control switch 1. The zoom switch command signal is input to the power amplifying circuit 10 via the zoom speed variable volume control 3 for changing the driving speed of the zoom lens optical system 7 in accordance with the manipulation amount of the zoom control switch 1, amplified to a predetermined level by the power amplifying circuit 10, and input to the motor 11. Then, the motor 11 operates to drive the zoom lens optical system 7.

Figure 2:
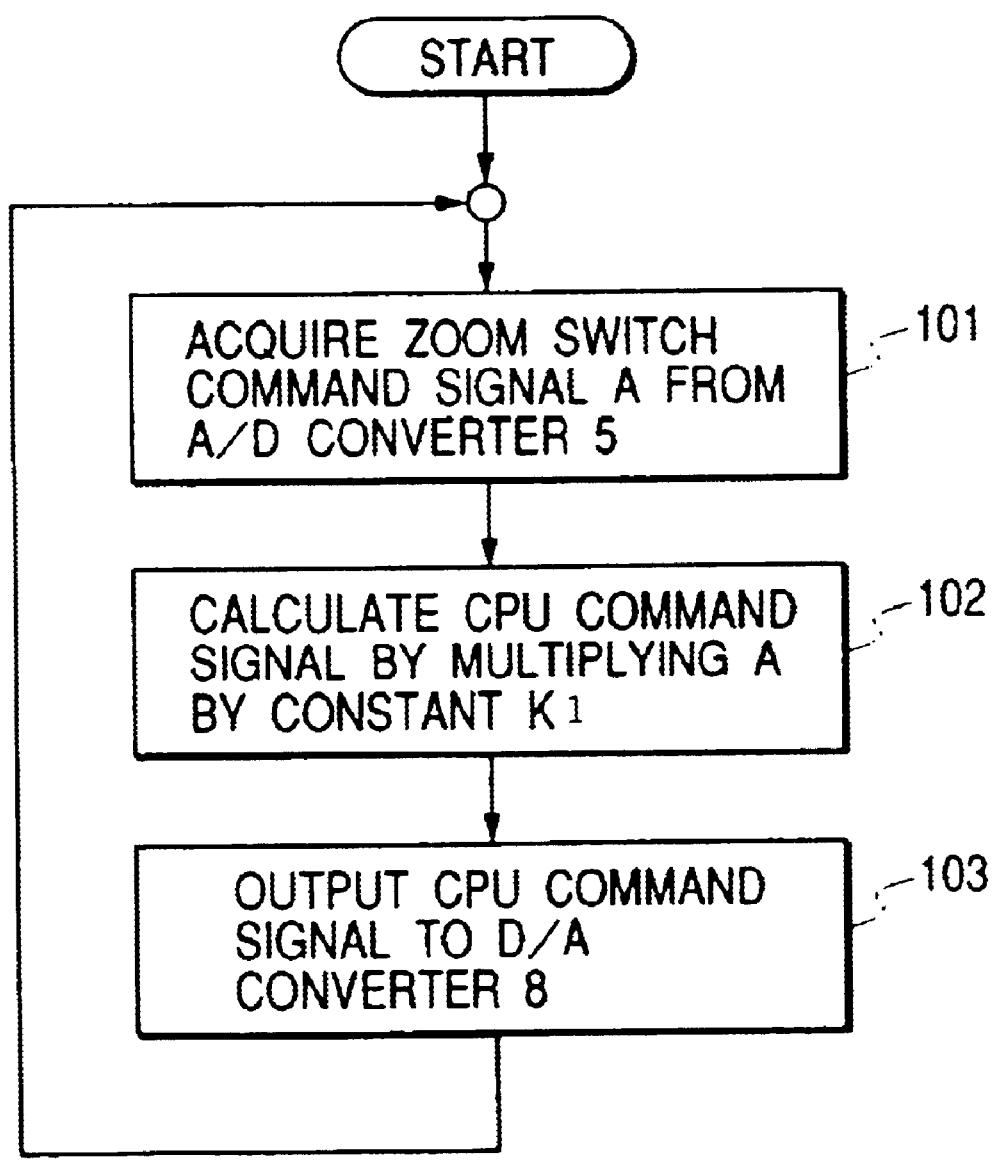
FIG. 2 is a flow chart showing the processing of a CPU when a zoom lens optical system is controlled from a zoom control switch in the TV lens.

Processing of the CPU 6 at this time will be described with reference to FIG. 2. The CPU 6 acquires a zoom switch command signal A from the A/D conversion circuit 5 (step 101), and calculates a CPU command signal by multiplying the zoom switch command signal A acquired in step 101 by a constant K1 (step 102). The CPU 6 outputs the CPU command signal to the D/A conversion circuit 8 (step 103).

The position of the zoom lens optical system 7 necessary to store a preset position can be detected by inputting an output from the position detector 15 to the CPU 6 via the position signal calculation circuit 16 and A/D conversion circuit 17.

The driving speed and driving direction of the zoom lens optical system 7 necessary to store a preset speed and preset direction can be detected by inputting an output from the speed detector 12 to the CPU 6 via the speed signal calculation circuit 13 and A/D conversion circuit 14.

As will be described later, whether the zoom control switch 1 necessary to store a preset speed and preset direction was manipulated can be determined by outputting a command signal proportional to the manipulation amount of the zoom control switch 1 from the command signal generation circuit 2 and inputting the command signal to the CPU 6 via the zoom speed variable volume control 3, command signal calculation circuit 4, and A/D conversion circuit 5.

Setting of preset information necessary to realize the preset driving control functions "fast position preset zoom", "memory position preset zoom", "speed preset zoom", and "shuttle zoom" will be sequentially explained.

Setting of a preset position for "fast position preset zoom" will be described. To set a preset position, the user drives the zoom lens optical system 7 to a position he she wants to preset in advance by manipulating the zoom control switch 1, and during the on state of the memory switch 23, changes the state of fast position preset zoom switch 19 from "OFF" to "ON". The CPU 6 stores the position of the zoom lens optical system 7 as a preset position in the CPU preset information memory 28.

Setting of a preset position for "memory position preset zoom" will be described. To set a preset position, similar to "fast position preset zoom", the user drives the zoom lens optical system 7 to a position he/she wants to preset in advance by manipulating the zoom control switch 1, and during the on state of the memory switch 23, changes the state of memory position preset zoom switch 20 from "OFF" to "ON". The CPU 6 stores the position of the zoom lens optical system 7 as a preset position in the CPU preset information memory 28.

Setting of a preset speed for "memory position preset zoom" will be described. To set a preset speed, the user manipulates the zoom control switch 1, and during driving the zoom lens optical system 7 at a speed he/she wants to preset in advance, changes the state of memory switch 23 from "OFF" to "ON". The CPU 6 stores the driving speed of the zoom lens optical system 7 obtained when the memory switch 23 is turned on from the OFF state, as a preset speed in the CPU preset information memory 28.

Setting of a preset speed and preset direction for "speed preset zoom" will be described. To set a preset speed and preset direction, the user manipulates the zoom control switch 1, and during driving the zoom lens optical system 7 in a direction at a speed he/she wants to preset in advance, changes the state of memory switch 23 from "OFF" to "ON". The CPU 6 stores the driving speed of the zoom lens optical system 7 obtained when the memory switch 23 is turned on from the OFF state, as a preset speed and the driving direction of the zoom lens optical system 7 as a preset direction in the CPU preset information memory 28.

Setting of a preset position for "shuttle zoom" will be described. To set a preset position, similar to "fast position preset zoom", the user drives the zoom lens optical system 7 to a position he/she wants to preset in advance by manipulating the zoom control switch 1, and during on state of the memory switch 23, changes the state of shuttle zoom switch 22 from "OFF" to "ON". The CPU 6 stores the position of the zoom lens optical system 7 as a preset position in the CPU preset information memory 28.

Write (or rewrite) of preset information in the memory 18 via the external write device 27 will be explained. Pieces of preset information of an arbitrary form sent from the external write device 27 are input to the signal converter 25 via the connector 26.

Of the pieces of preset information of an arbitrary form input from the external write device 27, information about the preset position includes a relative position within the movable range of the zoom lens optical system 7, i.e., a relative preset position representing the position of the zoom lens optical system 7 by a numerical value (driving amount from a predetermined end) of 1 to 2,000 prepared by dividing the movable range of the zoom lens optical system 7 into 2,000 at an equal interval, and an absolute preset position representing the position of the zoom lens optical system 7 as an absolute position by using a focal length.

Of the pieces of preset information of an arbitrary form input from the external write device 27, information about the preset speed includes a relative preset speed represented by a driving time taken from one end to the other end in the movable range of the zoom lens optical system 7, and an absolute preset speed represented by the driving time in preset control operation (e.g., driving time taken from a current position to a preset position).

Of the pieces of preset information of an arbitrary form input from the external write device 27, information about the preset direction includes an absolute preset direction representing a wide-angle side or telephoto side to which the zoom lens optical system 7 is driven.

In accordance with a command from the CPU 6, the signal converter 25 uses optical conversion information stored in the CPU optical information memory 29, and converts the input pieces of preset information (relative preset position, absolute preset position, relative preset speed, absolute preset speed, and absolute preset direction) of an arbitrary form into pieces of preset information (to be referred to as actual preset information) of a form processible by the CPU 6 in performing preset driving control that correspond to a position signal and speed signal from the zoom position detector 15 and zoom speed detector 12. The converted pieces of actual preset information are stored in the memory 18 via the CPU 6.

Contents of information conversion processing by the signal converter 25 will be exemplified. When a relative preset position (e.g., 16-bit data "65535") is input from the external write device 27 and the rotational position of the above-mentioned lens operation ring (driving mechanism) is represented by data of "0" to "4,000" in the CPU 6, as shown in FIG. 9, the signal converter 25 uses a conversion equation as optical conversion information, converts the relative preset position into actual rotational position data of the lens operation ring such as "2,504", and stores this rotational position data as an actual preset position in the memory 18.

Figure 9:
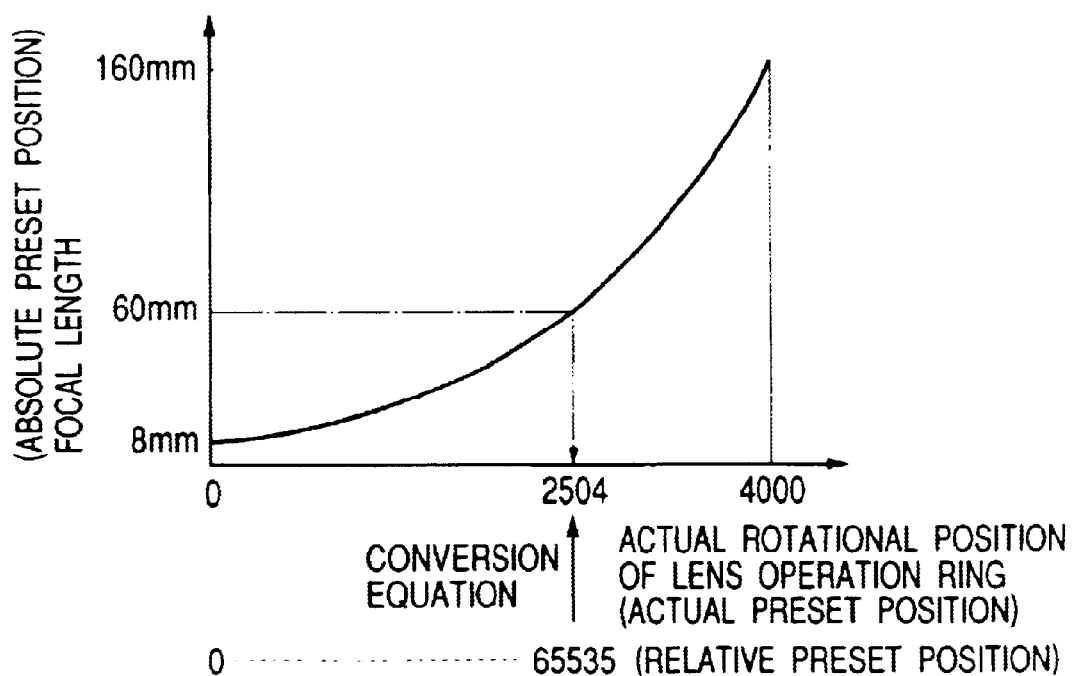
FIG. 9 is a graph schematically showing conversion of preset information from the external write device.

When an absolute preset speed (e.g., data of a focal length "60 mm") is input from the external write device 27, the signal converter 25 uses table data as optical conversion information, converts the absolute preset position into actual rotational position data of the lens operation ring such as "2,504", as shown in FIG. 9, and stores the rotational position data as an actual preset position in the memory 18.

When a relative preset position (e.g., driving time data "FFF") is input from the external write device 27, the signal converter 25 uses table data as optical conversion information, converts the relative preset speed into actual rotational speed data of the lens operation ring such as "max" or "½max", and stores the rotational speed data as an actual preset speed in the memory 18.

When an absolute preset speed (e.g., driving time data taken from a current position to a preset position) is input from the external write device 27, the signal converter 25 uses an arithmetic equation as optical conversion information, calculates the difference between the preset position and the current position, converts the absolute preset speed into actual rotational speed data of the lens operation ring by, e.g., looking up table data for the difference value and driving time data, and stores the rotational speed data as an actual preset speed in the memory 18.

When an absolute preset direction (data "wide-angle side" or "telephoto side") is input from the external write device 27, the signal converter 25 uses a conversion table as optical conversion information, converts the absolute preset direction into actual rotational direction data of the lens operation ring such as a clockwise or counterclockwise direction, and stores the rotational direction data as an actual preset direction in the memory 18.

Figure 3:
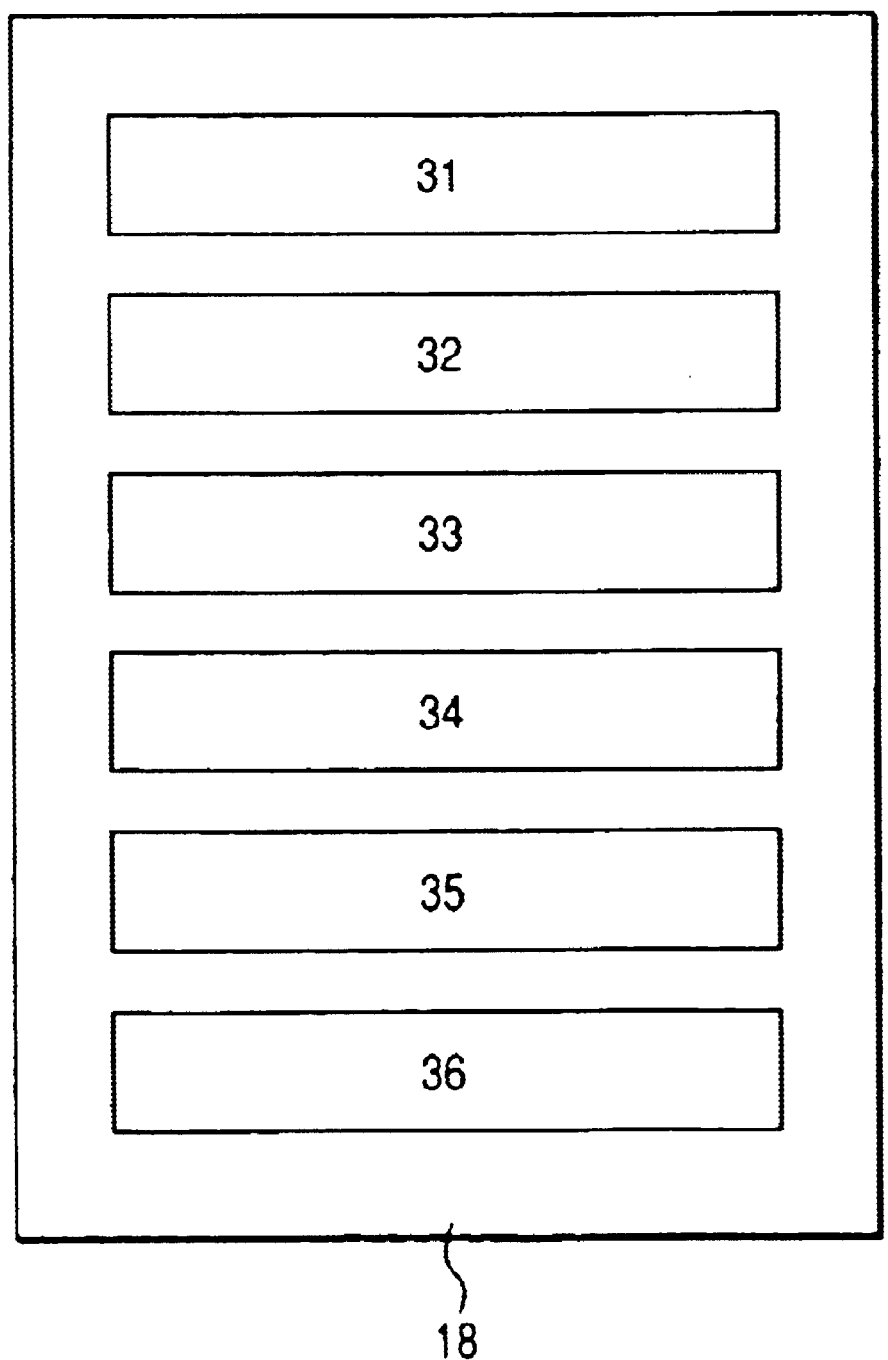
FIG. 3 is a block diagram showing the internal arrangement of a memory in the TV lens.
Figure 4:
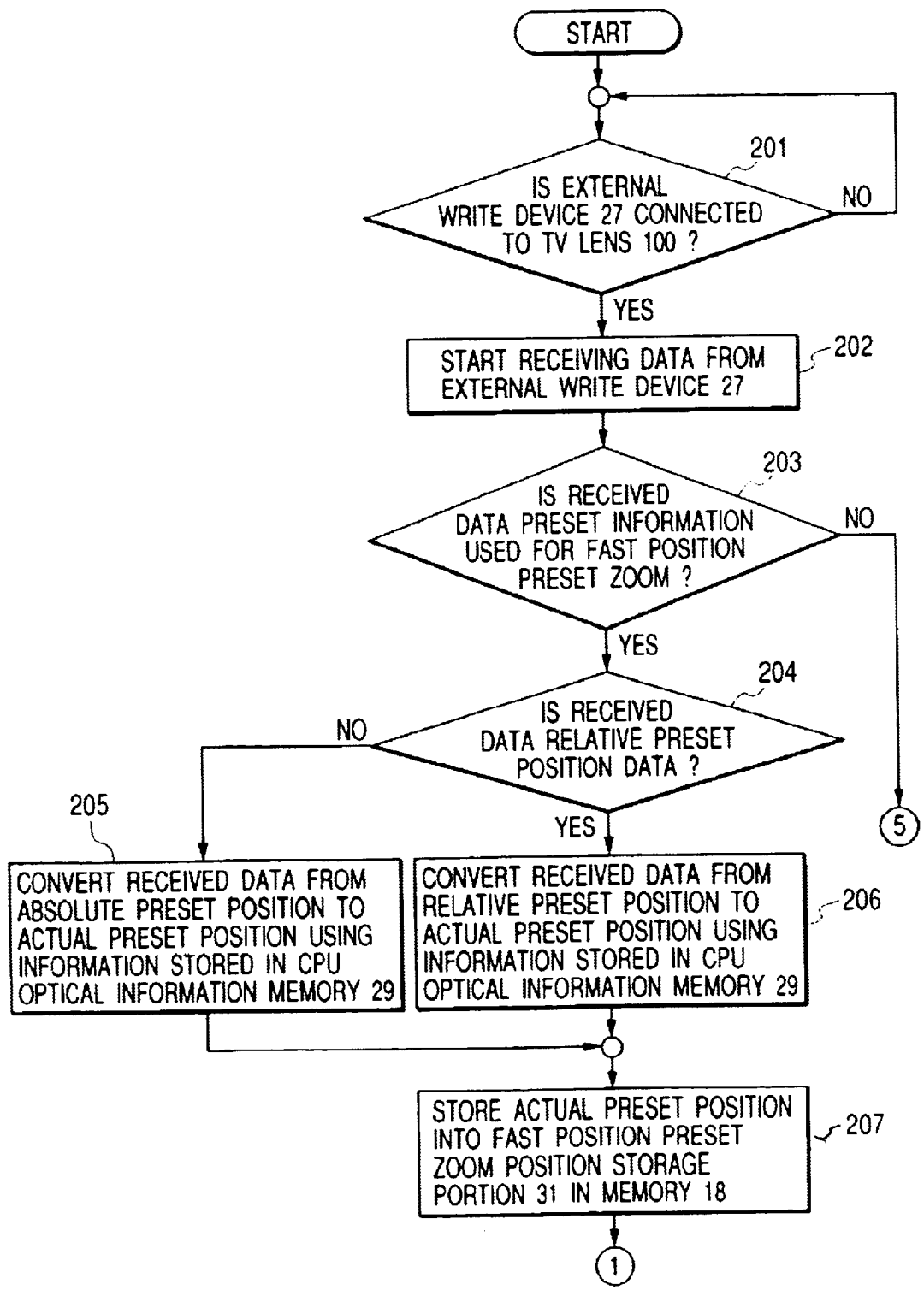
FIG. 4 is a flow chart showing the processing of the CPU when preset information from an external write device connected to the TV lens is set.
Figure 5:
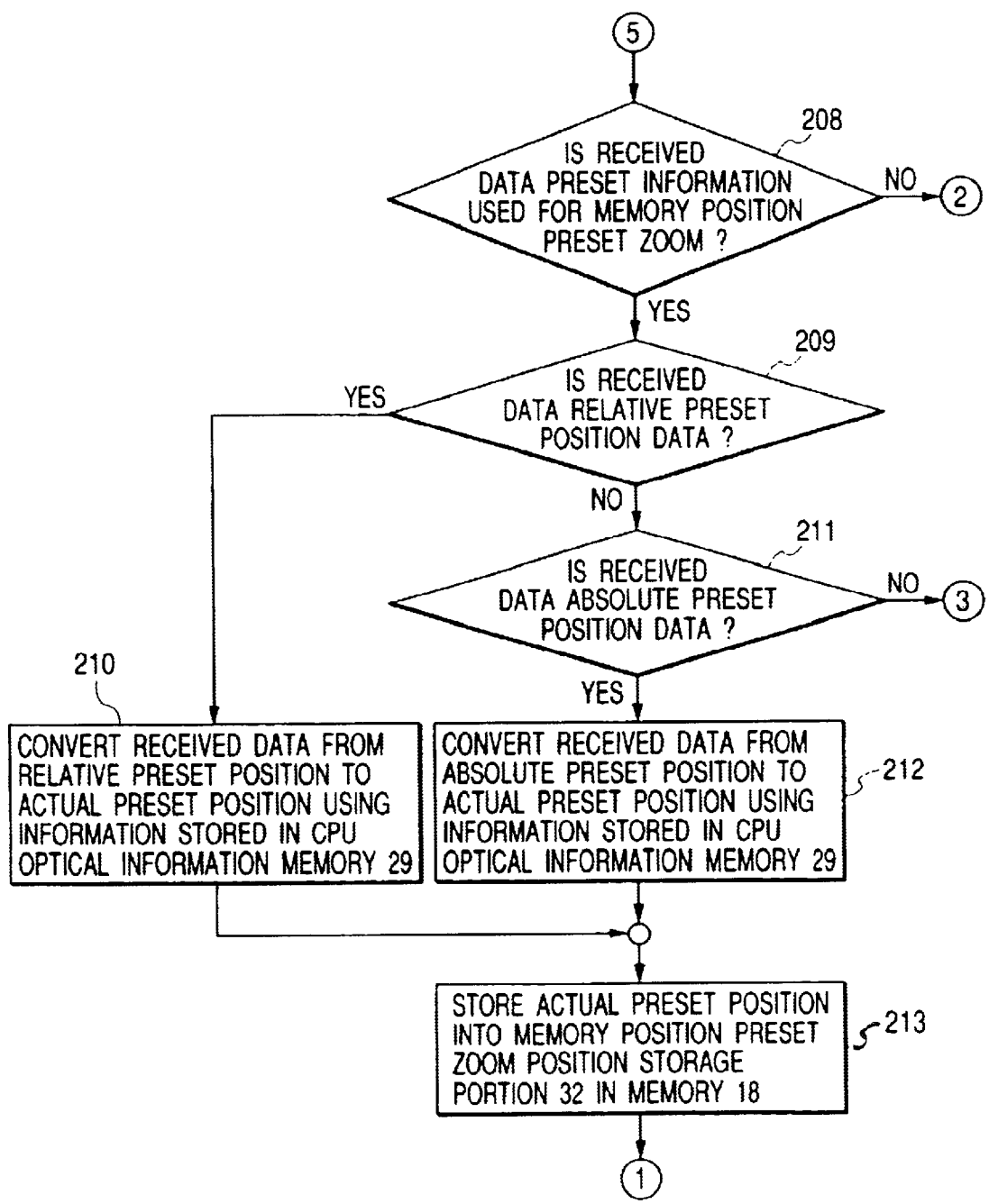
FIG. 5 is a flow chart showing the processing of the CPU when preset information from the external write device is set.
Figure 6:
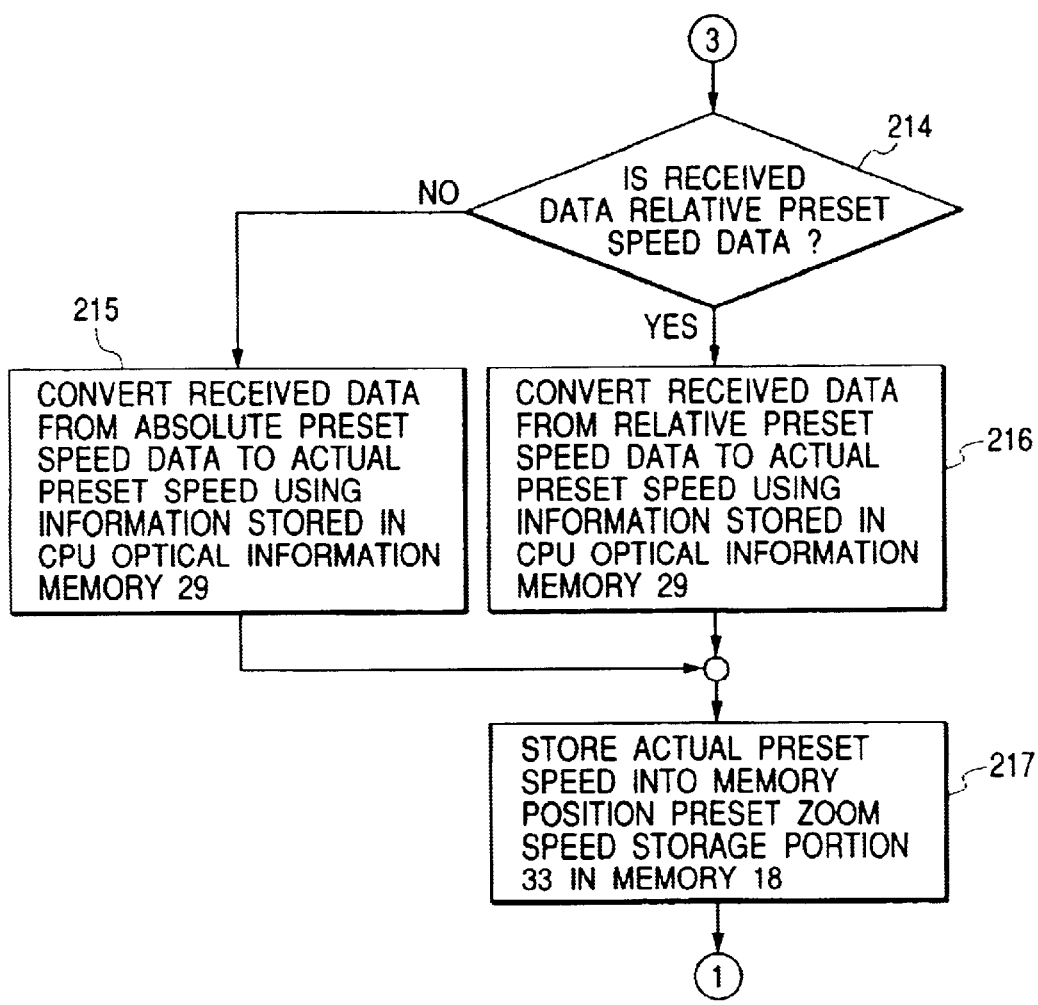
FIG. 6 is a flow chart showing the processing of the CPU when preset information from the external write device is set.
Figure 7:
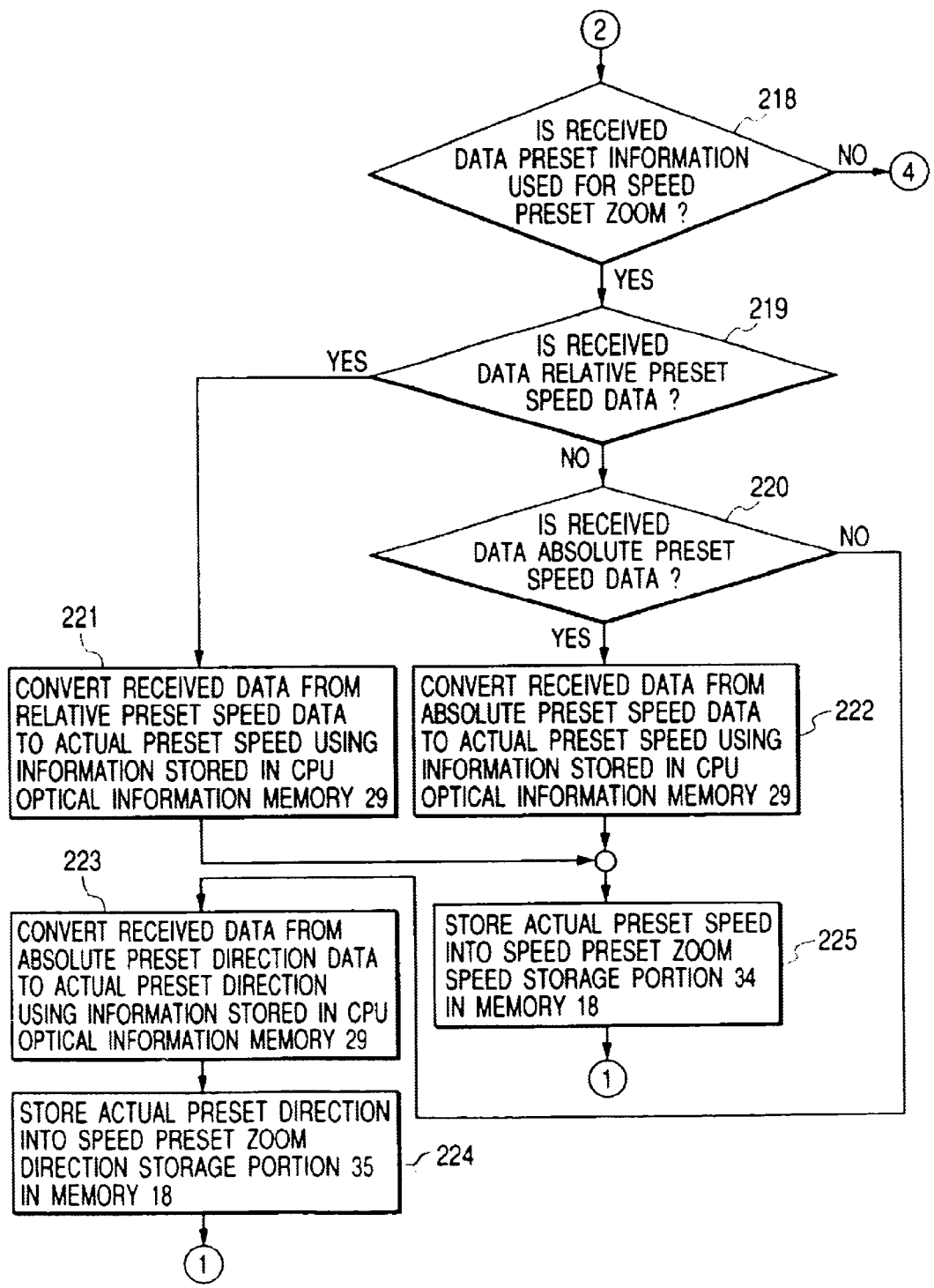
FIG. 7 is a flow chart showing the processing of the CPU when preset information from the external write device is set.
Figure 8:
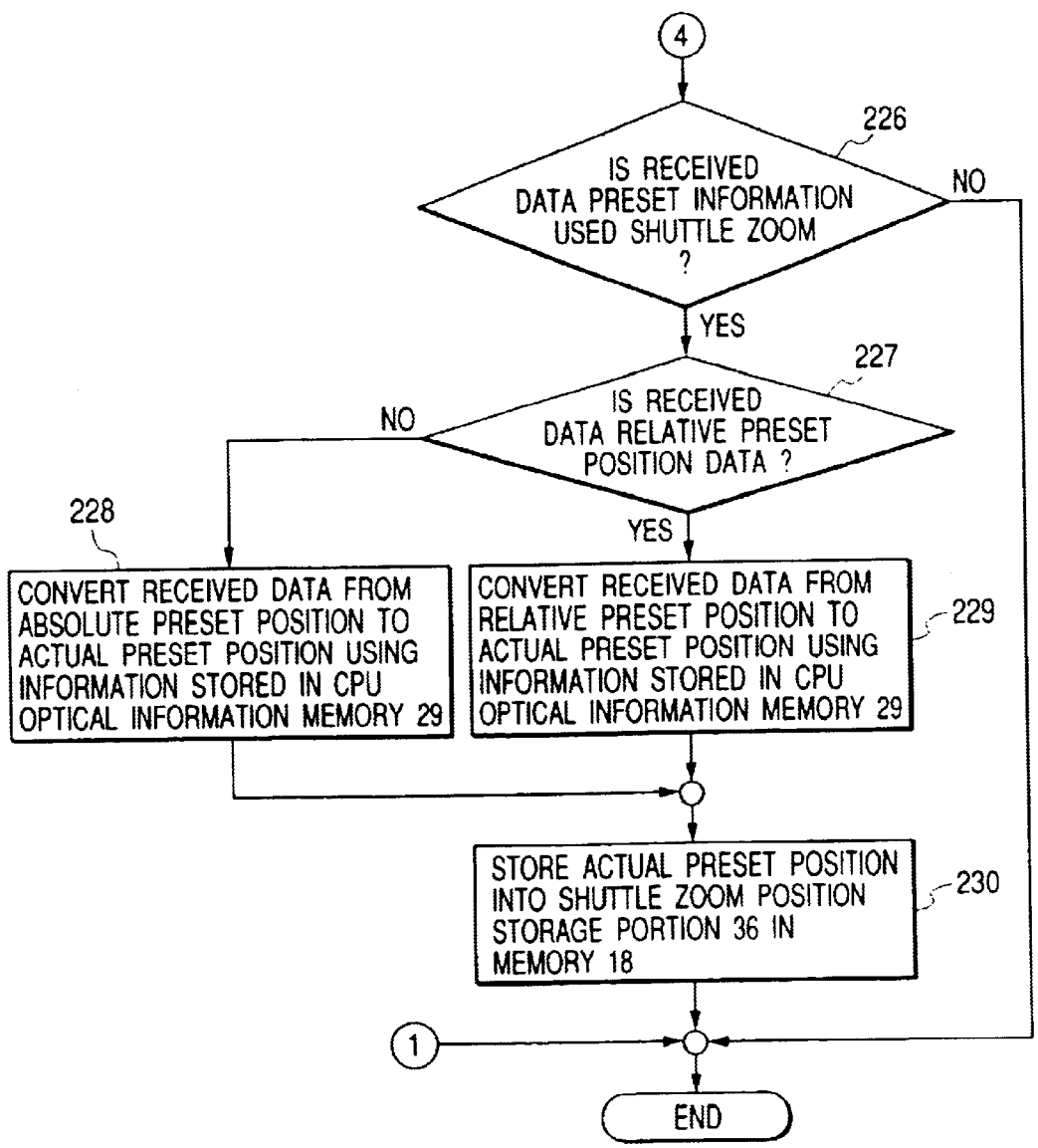
FIG. 8 is a flow chart showing the processing of the CPU when preset information from the external write device is set.

The internal structure of the memory 18 will be described with reference to FIG. 3. In FIG. 3, a fast position preset zoom position storage portion 31 stores an actual preset position used for "fast position preset zoom". A memory position preset zoom position storage portion 32 stores an actual preset position used for "memory position preset zoom". A memory position preset zoom speed storage portion 33 stores an actual preset speed used for "memory position preset zoom". A speed preset zoom speed storage portion 34 stores an actual preset speed used for "speed preset zoom". A speed preset zoom direction storage portion 35 stores an actual preset direction used for "speed preset zoom". A shuttle zoom position storage portion 36 stores an actual preset position used for "shuttle zoom".

The CPU 6 stores pieces of actual preset information converted by the signal converter 25 in the storage portions 31 to 36 in accordance with the types of pieces of information.

Processes of the CPU 6 and information converter 25 in writing (or rewriting) preset information in the memory 18 from the external write device 27 will be explained with reference to flow charts shown in FIGS. 4 to 8. Note that the same circled figures in FIGS. 4 to 8 mean that they are linked to each other.

The CPU 6 confirms an input from the information converter 25 and determines whether the external write device 27 is connected to the TV lens 100 (step 201). Whether the external write device 27 is connected is determined by receiving connection confirmation data or the like from the external write device 27 or attaching an identification pin to the connector 26.

If No in step 201, step 201 is repeated; or if Yes, the CPU 6 starts receiving data (preset information of an arbitrary form) from the external write device 27 (step 202). The data received from the external write device 27 includes data for identifying the use in any one of the four preset driving control functions.

Whether the data received from the external write device 27 is preset information used for "fast position preset zoom" is determined (step 203). If Yes in step 203, whether the received data is relative preset position data is checked (step 204).

If the received data is not relative preset position data, i.e., is absolute preset position data (No in step 204), the absolute preset position data is converted into an actual preset position using optical conversion information stored in the CPU optical information memory 29, as described above (step 205). If Yes in step 204, the relative preset position data is converted into an actual preset position using optical conversion information stored in the CPU optical information memory 29, as described above (step 206).

After this processing, the actual preset position converted in step 205 or 206 is written and stored in the fast position preset zoom position storage portion 31 of the memory 18, and the processing ends (step 207).

If No in step 203, whether the received data is preset information used for "memory position preset zoom" is determined (step 208). If Yes in step 208, whether the received data is relative preset position data is checked (step 209).

If Yes in step 209, the relative preset position data is converted into an actual preset position using optical conversion information stored in the CPU optical information memory 29, as described above (step 210). If No in step 209, whether the received data is absolute preset position data is checked (step 211). If Yes in step 211, the absolute preset position data is converted into an actual preset position using optical conversion information stored in the CPU optical information memory 29, as described above (step 212).

After this processing, the actual preset position converted in step 210 or 212 is written and stored in the memory position preset zoom position storage portion 32 of the memory 18, and the processing ends (step 213).

If No in step 211, whether the received data is relative preset speed data is determined (step 214). If the received data is not relative preset speed data, i.e., is absolute preset speed data, the absolute preset speed data is converted into an actual preset speed using optical conversion information stored in the CPU optical information memory 29, as described above (step 215). If the received data is relative preset speed data, the relative preset speed data is converted into an actual preset speed using optical conversion information stored in the CPU optical information memory 29, as described above (step 216).

After this processing, the actual preset speed converted in step 215 or 216 is written and stored in the memory position preset zoom speed storage portion 33 of the memory 18, and the processing ends (step 217).

If No in step 208, whether the received data is preset information used for "speed preset zoom" is determined (step 218). If Yes in step 218, whether the received data is relative preset speed data is checked (step 219).

If Yes in step 219, the relative preset speed data is converted into an actual preset speed using optical conversion information stored in the CPU optical information memory 29, as described above (step 221). If No in step 219, whether the received data is absolute preset speed data is checked (step 220).

If Yes in step 220, the absolute preset speed data is converted into an actual preset speed using optical conversion information stored in the CPU optical information memory 29, as described above (step 222).

After this processing, the actual preset speed converted in step 221 or 222 is written and stored in the speed preset zoom speed storage portion 34 of the memory 18, and the processing ends (step 225).

If the received data is not absolute preset speed data, i.e., is absolute preset direction data in step 220, the absolute preset direction data is converted into an actual preset direction using optical conversion information stored in the CPU optical information memory 29, as described above (step 223). The actual preset direction converted in step 223 is written and stored in the speed preset zoom direction storage portion 35 of the memory 18, and then the processing ends (step 224).

If No in step 218, whether the received data is preset information used for "shuttle zoom" is checked (step 226). If Yes in step 226, whether the received data is relative preset position data is determined (step 227).

If the received data is not relative preset position data, i.e., is absolute preset position data (No in 227), the absolute preset position data is converted into an actual preset position using optical conversion information stored in the CPU optical information memory 29, as described above (step 228). If Yes in 227, the relative preset position data is converted into an actual preset position using optical conversion information stored in the CPU optical information memory 29, as described above (step 229).

After this processing, the actual preset position converted in step 228 or 229 is written and stored in the shuttle zoom position storage portion 36 of the memory 18, and the processing ends (step 230).

If No in step 226, the processing directly ends.

In this way, pieces of preset information are stored in the memory 18 via the external write device 27 in advance. The respective preset driving control functions using these pieces of preset information can be executed.

When there is preset information stored in the memory 18 via the external write device 27, and preset information stored in the CPU preset information memory 28 of the TV lens 100 by using the zoom control switch 1, fast position preset zoom switch 19, memory position preset zoom switch 20, speed preset zoom switch 21, shuttle zoom switch 22, and memory switch 23, preset driving control using the preset information in the CPU preset information memory 28 can be performed by turning on the preset information selector switch 24 by the user, and preset driving control using the preset information in the memory 18 can be performed by keeping the preset information selector switch 24 off.

As described above, according to the first embodiment, preset information can be set (stored in the memory 18) in the TV lens 100 via the external write device 27. For example, in photographing an image by remote control, the user can easily set preset information without going to the place where the TV lens 100 is set. A preset position can be set by inputting focal length information from the external write device 27, or a preset speed can be set by inputting information about the entire range driving time of the zoom lens optical system 7 from the external write device 27. Inputting information of an arbitrary form implements a more useful preset driving control function.

(Second Embodiment)

In the first embodiment, preset information input as information of an arbitrary form from the external write device 27 is converted by the information converter 25 into a form processable by the CPU 6 and stored in the memory 18. Alternatively, preset information of a form processable by a CPU 6 may be directly input from an external write device 27 and stored in a memory 18.

(Third Embodiment)

In the first embodiment, preset information is input as a set value via the external write device 27, converted into a form processable by the CPU 6, and then stored in the memory 18. Alternatively, a function capable of setting preset information similarly to setting of preset information in a TV lens 100 may be provided to an external write device 27 by arranging a zoom control switch (driving command operation means) for designating driving of the zoom lens optical system 7 and a memory switch (storage command operation means) for designating storage of the driving state of a zoom lens optical system 7, i.e., a driving position or a driving speed and direction in a memory 18.

(Fourth Embodiment)

In the first embodiment, preset information is set in the TV lens 100 by actually driving the zoom lens optical system 7. Alternatively, preset information may be set (stored) using a setting means such as a volume or switch without actually driving a zoom lens optical system 7.

In each embodiment, a preset position, preset speed, and preset direction can be set as preset information. However, another preset information can be set.

Each embodiment has exemplified preset driving control of a zoom lens optical system. The present invention can also be applied to preset driving control of a focus lens optical system, imaging lens optical system, and light quantity adjustment system.

As has been described above, according to the present invention, preset information such as a preset position, preset speed, or preset direction can be set via an information write device set outside (e.g., remote place) an optical device or driving unit. Particularly in a remote-control photographing form, the user can set preset information without going close to the optical device or the like, which improves the practical convenience.

The optical device or driving unit is equipped with an information conversion means for converting preset information of an arbitrary form received from the information write device into preset information of a form processable in preset driving control and storing the converted preset information in a storage means. This enables conversion setting of a preset position by inputting a desired focal length to the information write device, or enables conversion setting of a preset speed by inputting a desired entire zoom range driving time to the information write device. As a result, better convenience can be attained.

Choices of usable preset information can be increased and a more useful preset control function can be realized by arranging a selection means for selecting which of preset information set on the device side or preset information acquired via the information write device is used to perform preset driving control.

What is claimed is:

1. A preset information setting system comprising:

an optical device; and an information write device set outside said optical device and connected to said optical device, wherein said optical device includes an optical member, drive means for driving said optical member, storage means for storing preset information which is written by said information write device and relates to driving of said optical member, and control means for controlling said drive means, and wherein said control means performs preset drive control of said drive means on the basis of the preset information stored in said storage means.

2. A preset information setting system according to claim 1, wherein said information write device generates preset information of an arbitrary form, and said optical device further comprises information conversion means for converting the preset information of the arbitrary form from said information write device into preset information of a form processable by said control means, said information conversion means storing the converted preset information of the processible form in said storage means.

3. A preset information setting system according to claim 1, wherein said information write device generates, as preset information of an arbitrary form, relative position information representing a driving amount from a predetermined position in a movable range of said optical member, and said optical device further comprises information conversion means for converting the relative position information from said information write device into preset information representing an actual driving position of said optical member, said information conversion means storing the converted preset information representing the actual driving position in said storage means.

4. A preset information setting system according to claim 1, wherein said information write device generates focal length information as preset information of an arbitrary form, and said optical device further comprises information conversion means for converting the focal length information from said information write device into preset information representing an actual driving position of said optical member, said information conversion means storing the converted preset information representing the actual driving position in said storage means.

5. A preset information setting system according to claim 1, wherein said information write device generates, as preset information of an arbitrary form, driving time information representing a driving time taken from one end to the other end in a movable range of said optical member, and said optical device further comprises information conversion means for converting the driving time information from said information write device into preset information representing an actual driving speed of said optical member, said information conversion means storing the converted preset information representing the actual driving speed in said storage means.

6. A preset information setting system according to claim 1, wherein said information write device generates, as preset information of an arbitrary form, range driving time information representing a driving time in a driving range of the preset driving control, and said optical device further comprises information conversion means for converting the range driving time information from said information write device into preset information representing a driving speed of said optical member, said information conversion means storing the converted preset information representing the driving speed in said storage means.

7. A preset information setting system according to claim 1, wherein said information write device generates preset information of a form processible in the preset drive control, and stores the generated preset information in said storage means.

8. A preset information setting system according to claim 1, wherein said optical member includes a zoom lens optical system.

9. A preset information setting system according to claim 1, wherein said information write device includes a computer.

10. A preset information setting system comprising:

an optical device; and an information write device set outside said optical device and connected to said optical device, wherein said optical device includes an optical member, drive means for driving said optical member, storage means for storing first preset information which is written by said information write device and relates to driving of said optical member, storage operation setting means operated to store second preset information into said storage means, and control means for controlling said drive means, and wherein said control means selects one of the first preset information and the second preset information stored in said storage means, and performs preset drive control of said drive means on the basis of the selected first preset information or second preset information.

11. An optical device comprising:

an optical member;

drive means for driving said optical member;

storage means for storing preset information which is written by an external information write device and relates to driving of said optical member; and control means for controlling said drive means, wherein said control means performs preset drive control of said drive means on the basis of the preset information stored in said storage means.

12. An optical device comprising:

an optical member;

drive means for driving said optical member;

storage means for storing first preset information which is written by an external information write device and relates to driving of said optical member;

operation setting means for setting second preset information that relates to driving of said optical member; and control means for controlling said drive means, wherein said control means selects one of first preset information which is stored in said storage means and the second preset information which is set by said operation setting means, and wherein said control means performs preset drive control of said drive means on the basis of the selected first preset information or second preset information.

* * * * *

UNITED STATES PATENT AND TRADEMARK OFFICE
CERTIFICATE OF CORRECTION

PATENT NO.    : 6,704,503 B2
DATED         : March 9, 2004
INVENTOR(S)   : Kazumasa Yoshikawa et al.

It is certified that error appears in the above-identified patent and that said Letters Patent is hereby corrected as shown below:

Column 7,
Line 28, "he the" should read -- he/she --.

Signed and Sealed this

Thirtieth Day of November, 2004

JON W. DUDAS
*Director of the United States Patent and Trademark Office*